United States Patent
Srinivas

(10) Patent No.: US 8,516,566 B2
(45) Date of Patent: Aug. 20, 2013

(54) SYSTEMS AND METHODS FOR USING EXTERNAL AUTHENTICATION SERVICE FOR KERBEROS PRE-AUTHENTICATION

(75) Inventor: Rahul Srinivas, Karnataka (IN)

(73) Assignee: Apple Inc., Cupertino, CA (US)

( * ) Notice: Subject to any disclaimer, the term of this patent is extended or adjusted under 35 U.S.C. 154(b) by 1023 days.

(21) Appl. No.: 12/016,363

(22) Filed: Jan. 18, 2008

(65) Prior Publication Data

US 2009/0110200 A1 Apr. 30, 2009

(30) Foreign Application Priority Data

Oct. 25, 2007 (IN) ............................ 2237/DEL/2007

(51) Int. Cl.
- *G06F 9/00* (2006.01)
- *G06F 15/16* (2006.01)
- *G06F 17/00* (2006.01)
- *G06F 21/00* (2006.01)
- *H04L 9/32* (2006.01)
- *H04L 9/08* (2006.01)

(52) U.S. Cl.
USPC .............. 726/10; 726/14; 713/156; 713/168; 713/171; 380/46; 380/279

(58) Field of Classification Search
USPC .......................................................... 726/10
See application file for complete search history.

(56) References Cited

U.S. PATENT DOCUMENTS

| | | | | |
|---|---|---|---|---|
| 5,684,950 A * | 11/1997 | Dare et al. | ...................... | 726/10 |
| 5,841,871 A | 11/1998 | Pinkas | | |
| 5,864,665 A * | 1/1999 | Tran | ................................. | 726/10 |
| 5,913,025 A * | 6/1999 | Higley et al. | ..................... | 726/4 |
| 6,141,758 A * | 10/2000 | Benantar et al. | ................. | 726/10 |
| 6,175,920 B1 | 1/2001 | Shanze | | |
| 6,198,824 B1 * | 3/2001 | Shambroom | ................. | 380/279 |
| 6,401,211 B1 * | 6/2002 | Brezak et al. | ..................... | 726/5 |
| 6,427,209 B1 * | 7/2002 | Brezak et al. | .................. | 726/10 |
| 6,643,774 B1 * | 11/2003 | McGarvey | ..................... | 713/155 |
| 6,732,172 B1 | 5/2004 | House et al. | | |
| 6,742,114 B1 * | 5/2004 | Carter et al. | .................. | 713/156 |
| 6,826,695 B1 | 11/2004 | House et al. | | |
| 6,950,936 B2 | 9/2005 | Subramaniam et al. | | |
| 7,024,692 B1 | 4/2006 | Schanze et al. | | |
| 7,062,781 B2 * | 6/2006 | Shambroom | ................... | 726/10 |
| 7,089,211 B1 * | 8/2006 | Trostle et al. | ................... | 705/51 |
| 7,185,359 B2 | 2/2007 | Schmidt et al. | | |
| 7,243,370 B2 * | 7/2007 | Bobde et al. | ..................... | 726/10 |
| 7,308,709 B1 * | 12/2007 | Brezak et al. | .................. | 726/10 |
| 7,366,900 B2 * | 4/2008 | Shambroom | ................ | 713/168 |
| 7,472,273 B2 * | 12/2008 | Haverinen | .................... | 713/168 |
| 7,490,237 B1 * | 2/2009 | Morais et al. | ................. | 713/170 |

(Continued)

OTHER PUBLICATIONS

Cisco, Kerberos Overview—An Authentication Service for Open Network Systems, Jan. 19, 2006, Document ID: 16087.*

(Continued)

*Primary Examiner* — Carolyn B Kosowski

(74) *Attorney, Agent, or Firm* — Blakely, Sokoloff, Taylor & Zafman LLP

(57) ABSTRACT

Systems and methods for providing Kerberos pre-authentication are presented. According to a method embodiment, a request for authentication is received from a principal of an authentication service. The principal in the authentication service is authenticated. A key associated with the authenticated principal in the authentication service is provided to a Kerberos Key Distribution Center (KDC).

21 Claims, 4 Drawing Sheets

(56) References Cited

U.S. PATENT DOCUMENTS

| | | | |
|---|---|---|---|
| 7,540,022 B2* | 5/2009 | Barari et al. ................... 726/10 |
| 7,562,217 B2* | 7/2009 | Kurose ........................... 713/168 |
| 7,581,243 B2* | 8/2009 | Shigeeda ........................... 726/3 |
| 7,757,275 B2* | 7/2010 | Crall et al. ......................... 726/5 |
| 7,818,792 B2* | 10/2010 | Shamsaasef et al. ........... 726/10 |
| 7,913,296 B2* | 3/2011 | Shigeeda ........................... 726/5 |
| 2001/0034833 A1* | 10/2001 | Yagasaki et al. ............... 713/156 |
| 2002/0147927 A1* | 10/2002 | Tait ............................... 713/201 |
| 2002/0150253 A1* | 10/2002 | Brezak et al. .................. 380/281 |
| 2003/0005280 A1 | 1/2003 | Bobde et al. |
| 2003/0140230 A1* | 7/2003 | de Jong et al. ................. 713/182 |
| 2003/0188193 A1* | 10/2003 | Venkataramappa .......... 713/201 |
| 2004/0098615 A1* | 5/2004 | Mowers et al. ............... 713/201 |
| 2004/0260946 A1* | 12/2004 | Cahill et al. .................. 713/201 |
| 2005/0198506 A1* | 9/2005 | Qi et al. ........................ 713/170 |
| 2005/0273495 A1* | 12/2005 | Faruqi et al. .................. 709/206 |
| 2006/0161974 A1* | 7/2006 | Innes et al. ..................... 726/10 |
| 2006/0190736 A1 | 8/2006 | John et al. |
| 2006/0224891 A1* | 10/2006 | Ilac et al. ...................... 713/171 |
| 2006/0236370 A1 | 10/2006 | John et al. |
| 2006/0236385 A1* | 10/2006 | Innes et al. ..................... 726/10 |
| 2007/0005801 A1 | 1/2007 | Kumar et al. |
| 2007/0061263 A1 | 3/2007 | Carter et al. |
| 2007/0094503 A1 | 4/2007 | Ramakrishna |
| 2007/0127723 A1* | 6/2007 | Grobman ...................... 380/278 |
| 2007/0157298 A1 | 7/2007 | Dingwall et al. |
| 2007/0192843 A1* | 8/2007 | Peterson et al. ................ 726/10 |
| 2008/0072303 A1* | 3/2008 | Syed ............................... 726/10 |
| 2008/0083026 A1* | 4/2008 | Sent ................................ 726/10 |
| 2008/0134311 A1* | 6/2008 | Medvinsky et al. .............. 726/7 |
| 2008/0175393 A1* | 7/2008 | Oba et al. ...................... 380/279 |
| 2008/0178277 A1* | 7/2008 | Oba et al. ........................ 726/10 |
| 2009/0007250 A1* | 1/2009 | Pouzin et al. .................... 726/10 |
| 2009/0241193 A1* | 9/2009 | Pandit et al. ..................... 726/23 |

OTHER PUBLICATIONS

Hartman, S., "A Generalized Framework for Kerberos Preauthentication", *Kerberos Working Group, Internet Draft*, (2004),1-14.

Josefsson, S., "Using Kerberos V5 over the Transport Layer Security (TLS) protocol", *Internet draft*, (Oct. 21, 2006),12 pgs.

Neuman, C., et al., "RVC4120—The Kerberos Network Authentication Service (V5)", http://www.ietf.org/rfc/rfc4120.txt, (Jul. 2005),pp. 1-136.

* cited by examiner

SYSTEMS AND METHODS FOR USING EXTERNAL AUTHENTICATION SERVICE FOR KERBEROS PRE-AUTHENTICATION

RELATED APPLICATIONS

This application claims the benefit of priority to India Patent Application No. 2237/DEL/2007 filed in the India Patent Office on Oct. 25, 2007 and entitled "SYSTEMS AND METHODS FOR USING EXTERNAL AUTHENTICATION SERVICE FOR KERBEROS PRE-AUTHENTICATION;" the disclosure of which is incorporated by reference herein.

FIELD

This disclosure relates generally to network authentication and more particularly to systems and methods for using an external authentication service for Kerberos pre-authentication.

BACKGROUND

Kerberos is an authentication protocol used for single sign-on in intranets. With Kerberos, a Key Distribution Center (KDC) distributes encrypted tickets and session keys to users and services for use in communication with one another. The encryption used is based on a shared secret, such as a password. The session keys permits messages to be encrypted and decrypted.

With single sign-on, a user does not need to use the same password for authentication to various services in the network, does not need to share a separate password with each service in the network, and does not have to enter his password more than once. Rather, the encrypted ticket and session key acquired by the user are used to authenticate the user and to encrypt and decrypt messages.

Originally, Kerberos has been a password-based authentication service. Work is being done to standardize a framework for using more flexible authentication mechanisms for Kerberos initial authentication. However, Kerberos is not easily implemented in some directory services which use connection-based authentication services that provide secure channels for authentication mechanisms to exchange data. It is difficult to tunnel exchanges for such authentication services through a Kerberos KDC, as the authentication services may use various sequences of multiple authentication mechanisms.

The Kerberos specification has been updated in rfc4120; and Section 7.2.2 of rfc4120 refers to using TCP transport for Kerberos requests, indicating that the KDC may close the TCP stream after sending a response, but may leave the stream open for a reasonable period of time if it expects a follow-up. Exchanges for an authentication service could be tunneled through a Kerberos KDC if the authentication service maintains state, and a transport layer is added for the authentication service.

Novell Modular Authentication Service (NMAS) has the following layers: Transmission Control Protocol (TCP) or Internetwork Packet Exchange (IPX); Network Core Protocol (NCP); and Multi-Authentication Framework (MAF) exchanges. If NMAS exchanges have to be tunneled through Kerberos KDC exchanges, a new Kerberos-based transport layer needs to be added to NMAS for the exchange of NMAS protocol data in Kerberos protocol packets. Authentication services that use SSL for securing its exchanges with the user also will have to support a new transport layer. However, the addition of a new transport layer is complex to implement. Additionally, existing Kerberos KDC implementations do not support multiple rounds of communication. As such, tunneling exchanges of an external authentication service through Kerberos exchanges would require major design changes to existing KDC implementations.

SUMMARY

According to a method embodiment, a request for authentication is received from a principal of an authentication service. The principal in the authentication service is authenticated. A key associated with the authenticated principal in the authentication service is provided to a Kerberos Key Distribution Center (KDC). According to various embodiments, the authentication service generates the key randomly after authenticating the principal.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION

Figure 1:
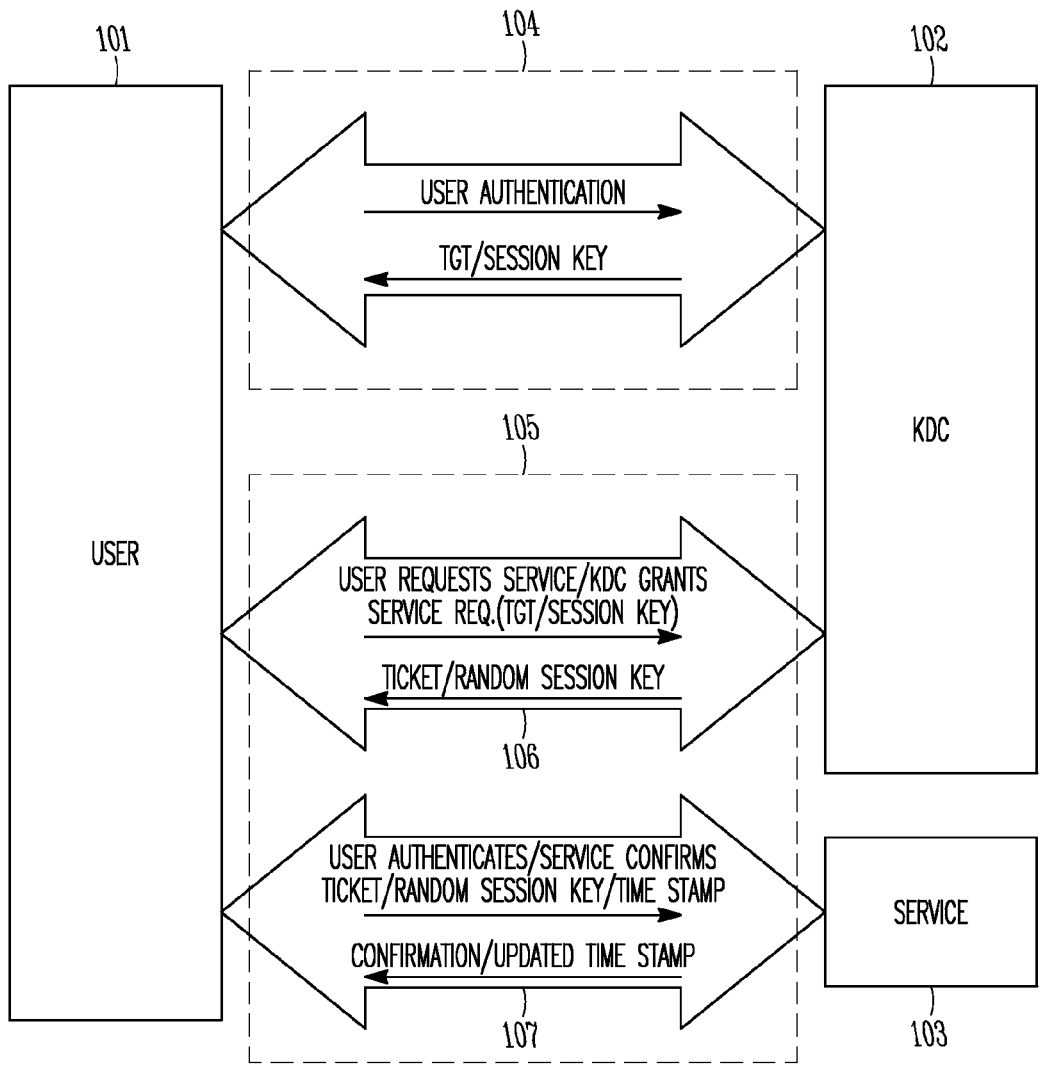
FIG. 1 illustrates an authentication process for a Kerberos-enabled network.

A "principal", also referred to herein as "user," includes an end-user, a service, an application, a system, or a device. A user may be viewed as a logical or a physical resource represented within a machine-accessible medium. A resource includes a service and may also include a device or machine (such as a printer, computer, intelligent apparel, intelligent appliance, phone, laptop, personal digital assistant (PDA) tablet personal computer (PC), network switch, hub, bridge, router, and the like). A resource may also include a user of a device or machine, a directory, or a data store (such as database, electronic file, data warehouse, and the like).

A "key" is electronic data that is used to encrypt and decrypt messages. A "session key" is a special type of key that is non-permanent or that is temporary. That is, a session key expires upon an event or condition, such as the expiration of a certain period of elapsed time from when the session key was initially generated and/or a detected event indicating a user has signed out of a service, and the like.

A "ticket" is a record used to authenticate to a server. A ticket contains a principal's identity, a session key, a timestamp, and other information, all sealed using the server's secret key. A principal is authenticated when the ticket is presented along with a fresh record containing information that can be shown to have been recently generated using the session key known only by the principal and the server.

Kerberos functions as a network single sign-on protocol, a method of authentication that enables a user to authenticate once and gain access to the resources of multiple software systems. Kerberos is a mechanism for applications to externalize authentication using a trusted third party (KDC), which can be used on a variety of platforms. Version 5 of the Kerberos protocol is specified in RFC 4120.

The KDC includes two logically separate parts: an Authentication Server (AS) and a Ticket Granting Server (TGS). Kerberos uses "tickets" to prove the identity of users. The KDC maintains a database of secret keys. Each network entity shares a secret key, which is used to authenticate a user's identity. The key is known only to the network entity and to the KDC. For communication between two entities, the KDC generates a session key which they can use to secure the interactions between the two entities.

In general, Kerberos has an initial authentication phase and a service authentication phase. In the initial authentication phase, the user authenticates to a Kerberos KDC in the network and the KDC responds by returning a ticket and a session key to the user. For example, some Kerberos systems may use a username and password to authenticate the user to the KDC. A user can use other mechanisms to authenticate himself. The present subject matter uses the authentication of a user by an authentication service, which may flexibly use various sequences of multiple authentication mechanisms, to authenticate the user to the KDC. For example, an authentication system can be implemented as part of a directory service. The ticket, also referred to as a ticket granting ticket (TGT) is encrypted with a cryptographic key known only to the KDC. The TGT includes the user's identity, and a random session key that is encrypted with the cryptographic key known only to the KDC. The Authentication Server of the KDC knows the password based keys of all users. The user proves its identity to the KDC in subsequent communication(s) using the TGT, such that user does not have to resend the logon information for the network (e.g. password). Thus, the Kerberos system is a single sign-on system. In the service authentication phase, the user authenticates to a service in the network (a file server for example). The KDC shares a long term key with the service just as it does with the user. The user sends a request for the service to the ticket granting service of the KDC. Knowledge of the session key present in the TGT from the initial authentication phase allows the user to prove its identity to the KDC. The KDC validates this request, verifies the requester's identity, and returns a ticket and a session key for the requested service. The ticket for the requested service is encrypted with a cryptographic key shared by the KDC and the service. This ticket contains a random session key. The session key for the requested service returned by the KDC is the random session key contained in the ticket for the service, encrypted with the session key from the initial authentication phase. The user can use these to authenticate to the service. The authentication request that the user sends to any service contains the ticket for the service and an authenticator, which proves the user's knowledge of the session key in the ticket to the service.

The KDC request, as defined in rfc4120, has a pre-authentication data field ("padata" field). This field is used by the user to send authentication information to the KDC. A request can include multiple padata fields and many types of padata. A common padata field used for Kerberos initial authentication is PA-ENC-TIMESTAMP, where the user encrypts the current time with a key derived from his password and puts the result in the padata field of the KDC request.

A Kerberos KDC is a stateless service. When a KDC sends a reply to a user's request, the KDC forgets all about the user's request and the reply. The KDC treats the next request from the user as a fresh request. This complicates the login for authentication mechanisms that involve more than two rounds of communication (user_request_1, KDC_reply_1, user_request_2, KDC_reply_2, etc.). Since the KDC does not keep track of state, the state should be included in the KDC request itself. For example, a multi-round communication, such as may be required for a sequence of authentication mechanisms, may include: a first communication from the user to the KDC that includes user_request_1; a second communication from the KDC to the user that includes KDC_reply_1; a third communication from the user to the KDC that includes user_request_1, KDC_reply_1, and user_request_2; and a fourth communication from the KDC to the user that includes KDC_reply_2.

The present subject matter allows a user who has authenticated to the authentication service of the directory service to authenticate to the KDC without requiring any additional user inputs, and access the Kerberos-enabled network services based on the authentication or login to the authentication service of the directory service.

The present subject matter adds a new mechanism to the authentication service, which sets up a random Kerberos key shared between the user and the directory service. A random password is generated by the authentication server, and the key is derived from the password using a one-way function defined in RFC 3961. This random password is returned to the user after authentication. The directory service caches this key for a short period of time (for example, on the order of five minutes). The KDC has a secure connection to the directory service and is able to lookup this key cache. Once the authentication service login is completed, the user uses this key to authenticate to the KDC to get a Kerberos initial ticket issued. This initial ticket can be used by the client to access network services.

The present subject matter addresses the initial authentication phase of the Kerberos process. NMAS is used for initial authentication. The random password returned at the end of NMAS authentication is used by the user to authenticate to the authentication service in the KDC using PA-ENC-TIMESTAMP type of "padata." In various embodiments, the present subject matter allows a user who has authenticated to the authentication service of the directory service to authenticate to the KDC without requiring any additional user inputs, and access the Kerberos-enabled network services based on the single-signon to the authentication service of the directory service. This may be integrated within a directory service and may represent a modified and enhanced KDC within that directory service. The tickets, also be referred to as TGT, and an encrypted session key pair may be viewed as a Kerberos Certificate. The TGT is encrypted with a key known to just the KDC, this permits it to be decrypted by just the KDC to verify an identity associated with the TGT.

Various embodiments of this can be implemented in existing resource or machine architectures as enhancements via network services. For example, some embodiments are implemented in whole or in part in the eDirectory® product, distributed by Novell®, Inc., of Provo, Utah. That is, in some embodiments, eDirectory® may be used to deploy services to users and services within a network that facilitate the single signon of a user to a Kerberos-enabled network using the authentication of the user to the Novell Modular Authentication Service (NMAS).

Novell eDirectory is a directory service software product for centrally managing access to resources on multiple servers and computers within a given network. The eDirectory service is a hierarchical, object oriented database that represents all the assets in an organization in a logical tree. Assets can include people, positions, servers, workstations, applications, printers, services, groups, etc. The use of dynamic rights inheritance and equivalence allows both global and fine grained access controls to be implemented efficiently. Access rights between objects in the tree are determined at the time of the request and is determined by the rights assigned to the objects by virtue of their location in the tree, any security equivalences and individual assignments. The eDirectory service supports partitioning at any point in the tree and replication of that partition to any number of servers. The eDirectory service supports referential integrity, multi-master replication and has a modular authentication architecture. NMAS is a component of the eDirectory service that secures a network while reducing security-related management costs. With NMAS, network access can be controlled using one or more login methods. Login methods can support the use of smart cards, proximity cards, Kerberos tickets, public/private PKI certificates, passwords, and challenge responses to authenticate your users. Additional login methods support the use of one-time password (OTP) tokens and biometric devices to provide extra layers of security.

NMAS supports multiple authentication mechanisms, such as password-based mechanisms, certificate-based mechanisms, biometric mechanisms and the like. Sequences of these mechanisms can be defined and associated with users. The user selects a sequence configured for him and completes authentication mechanisms in the sequence.

The present subject matter is not limited to the eDirectory service and NMAS. Rather, various embodiments can be implemented in a variety of architectural platforms, operating and server systems, or applications. Any particular architectural layout or implementation presented herein is provided for purposes of illustration and comprehension only and is not intended to be limiting.

The present subject matter uses external authentication servers (e.g. NMAS) as bootstrap authentication servers to authenticate to a Kerberos KDC. A key is cached at the end of the authentication of the external authentication service. The cached key can be used to integrate special purpose authentication services with a Kerberos KDC for single sign-on with only minor modifications to the KDC.

NMAS exchanges could be made using a padata field if a new NMAS padata type is created. However, it is difficult to create a cookie to maintain state securely because of the flexibility of NMAS. For example, NMAS supports sequences with ANDs and ORs, such as (password OR certificate) AND biometric.

The present subject matter keeps NMAS and KDC exchanges separate. The NMAS exchanges are not embedded in KDC requests. NMAS and KDC share a common data structure (a table). Once the NMAS authentication is complete, NMAS returns a random password to the user and puts a key derived from the random password into the table. The user uses the random password returned by the NMAS server to create the PA-ENC-TIMESTAMP, which is used to authenticate to the KDC.

Another embodiment includes in the password table the NMAS sequence that the user used to authenticate to the eDirectory service. The KDC can embed this sequence in the tickets it issues. When the user authenticates to any service, the service can use this information while granting access to the user—some critical resources managed by the server may require the user to have used strong authentication mechanisms like biometric. This is similar to the graded authentication feature of NMAS.

FIG. 1 illustrates an authentication process for a Kerberos-enabled network. The process can be implemented in a machine-access and machine-readable media. The illustrated network includes a user or client 101, a Kerberos KDC 102, and a service 103. The illustrated network shows an initial authentication phase 104 and a service authentication phase 105. In the initial authentication phase 104, the user authenticates to a Kerberos KDC in the network and the KDC responds by returning a ticket (TGT) with a session key to the user. In the service authentication phase 105, the user requests access to a service and the KDC grants access to the user as illustrated at 106, and the user authenticates itself to the requested service in the network (a file server for example) as illustrated at 107. In requesting the service 106, the user sends the TGT to authenticate itself to the KDC, and the KDC responds by granting a ticket with a random session key for use in communicating with the service. In communicating with the service 107, the user sends the ticket with the random session key and a time stamp to the service, and the services confirms with an updated time stamp.

Figure 2:
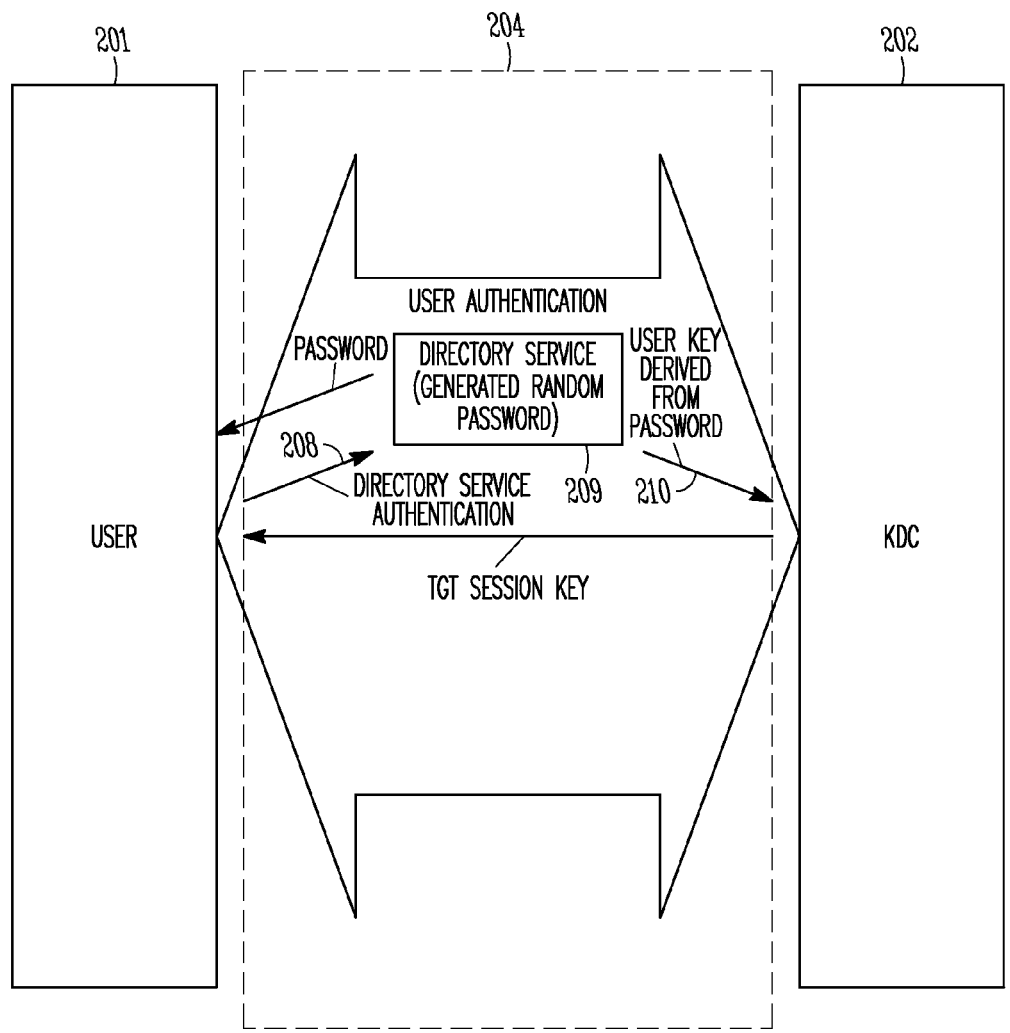
FIG. 2 illustrates an initial authentication phase for a Kerberos-enabled network, according to various embodiments.

FIG. 2 illustrates an initial authentication phase for a Kerberos-enabled network, according to various embodiments. The process can be implemented in a machine-access and machine-readable media. The illustrated figure includes a user 201 and a Kerberos KDC 202, and shows an initial authentication phase 204 between the user 201 and the KDC 202. As illustrated at 208, the user 201 authenticates itself to a directory service 209 (such as through the use of NMAS to login to the eDirectory service), and the directory service automatically provides the KDC 202 with a user key, as illustrated at 210. The authentication of the user to the directory service may but need not use a password. By way of example, and not limitation, smart cards can be used to authenticate a user. NMAS supports various types of mechanisms. The authentication server, such as may be used with a directory service 209, shares a random key with the KDC 202. A random password (human-readable unlike a key) is generated by the authentication server. The key is derived from the password using a one-way function. This random password is returned to the user after authentication. Once the user gets the password, he sends an authentication request to the KDC using PA-ENC-TIMESTAMP type "padata."

Figure 3:
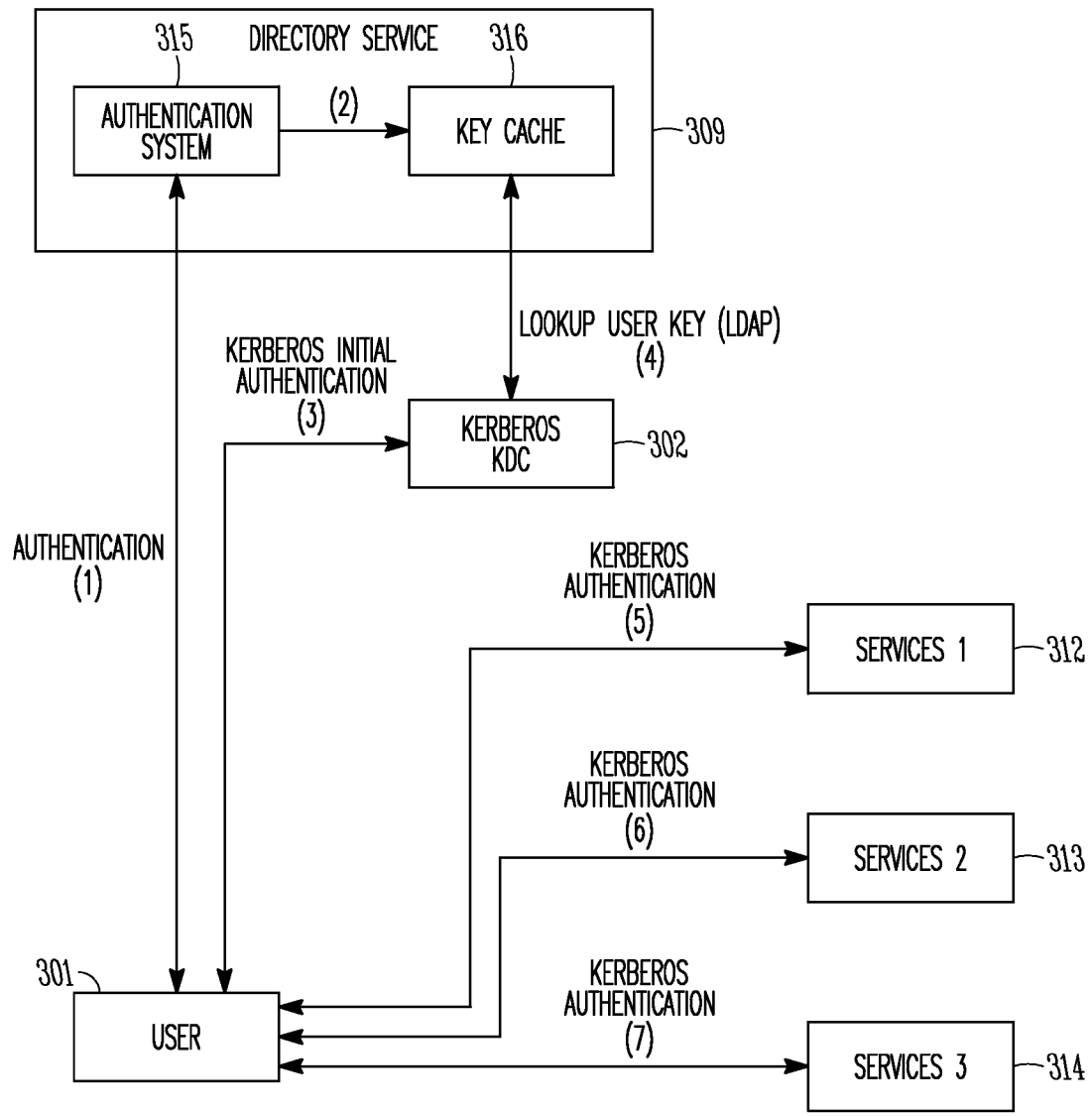
FIG. 3 illustrates an embodiment of a Kerberos-enabled network.

FIG. 3 illustrates an embodiment of a Kerberos-enabled network. The illustrated network includes a user 301, a directory service 309, a KDC 302, and services 312, 313, 314. The illustrated directory service 309 includes a mechanism, system or service to authenticate users for the directory service 315, and further includes a key cache 316 to store keys for the users that are provided to the KDC when the user is authenticated for the directory service.

The illustrated figure also shows a process performed by the network entities. The user 301 proves its identity to the authentication system 315 of the directory service 309. This may be a relatively simple process involving a username and password, or involve a more complex and flexible process capable of being performed by NMAS, for example. The authentication system 315 stores a key in the cache 316 (by looking it up in a lookup table, for example) associated with the user that has been authenticated for the directory service, and that key is used by the KDC 302 to provide the user with the initial authentication for the Kerberos-enabled network. Once the user 301 receives the TGT from the KDC, the user is allowed to request access to the service from the KDC, and the KDC grants tickets and session keys allowing the user and the requested service 312, 313, and/or 314 to communicate.

Figure 4:
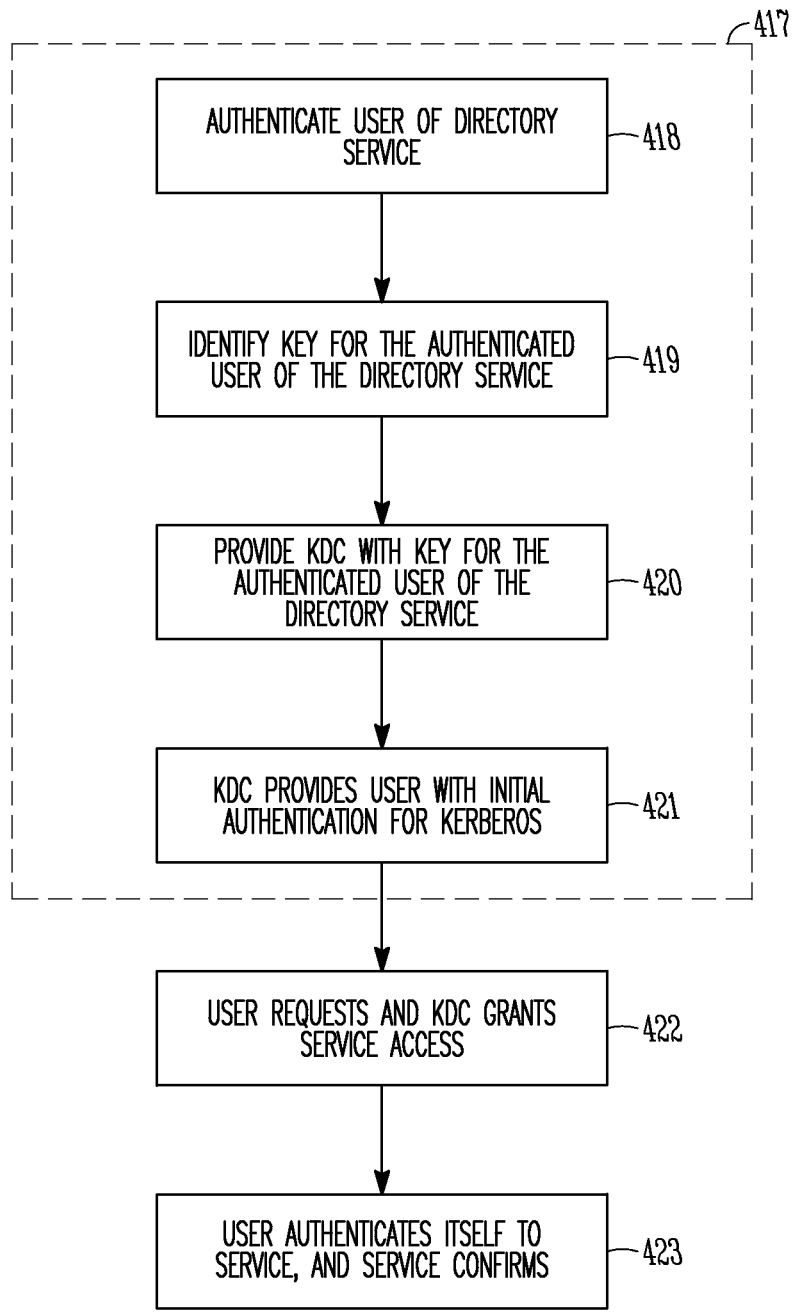
FIG. 4 illustrates an embodiment of a method for providing Kerberos pre-authentication for a Kerberos-enabled network using an external authentication service.

FIG. 4 illustrates an embodiment of a method for providing Kerberos pre-authentication for a Kerberos-enabled network using an external authentication service. The illustrated method includes pre-authentication, as represented by the dotted line 417. At 418, a user for a directory service is authenticated by an authentication service for the directory service. At 419, the directory service identifies a key for the authenticated user of the directory service, and at 420 the KDC is provided with the key associated with the authenticated user for the directory service. At 421, the KDC uses the key provided by the directory service for the authenticated user to authenticate the user and provide the user with initial authorization for Kerberos.

Once the user is initially authenticated for Kerberos, the user can request and the KDC can grant access to a Kerberos-enabled service in the network, as illustrated at 422. At 423, after the KDC grants the user a session key to communicate with the service, the user authenticates itself to the service, as illustrated at 423, the service confirms, and the user and service are able to communicate during the session.

One of ordinary skill in the art will understand that, the illustrated processes and entities can be implemented using software, hardware, and combinations of software and hardware. The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods are implemented as a set of instructions contained on a computer-accessible medium capable of directing a processor to perform the respective method. The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

We claim:

1. A method, comprising:
   receiving, from a principal of a directory service, a request for pre-authentication of the principal for Kerberos, the directory service configured for managing access to resources within a network system and comprising an authentication service;
   authenticating the principal for the directory service by the authentication service in response to receiving the request;
   identifying, by the authentication service, a key associated with the authenticated principle, wherein identifying the key comprises generating a random password for the authenticated principal and deriving the key from the random password;
   providing, by the authentication service, the key to a Kerberos Key Distribution Center (KDC) by storing the key in a data structure in the directory service that is accessible by the KDC; and
   sending, by the authentication service, the random password to the authenticated principal for use as pre-authentication information in a Kerberos authentication request subsequently sent by the authenticated principal to the KDC.

2. The method of claim 1, further comprising authenticating, by the KDC, the authenticated principal using the random password in the authentication request and the corresponding key in the data structure.

3. The method of claim 1, wherein the authentication service supports multiple authentication mechanisms to receive a sequence of authentication mechanisms from the principal.

4. The method of claim 3, wherein the sequence of authentication mechanisms includes one or more of the following types of mechanisms:
   password-based mechanisms, certificate-based mechanisms, or biometric-based mechanisms.

5. The method of claim 3, wherein the sequence of authentication mechanisms includes logical AND and logical OR connections between mechanisms.

6. The method of claim 3, wherein the directory service further comprises a hierarchical, object oriented database that represents organizational assets in a logical tree and is used to authenticate the principal.

7. The method of claim 3, wherein identifying the key further comprises storing the received sequence in the data structure for access by the KDC.

8. The method of claim 1, wherein the authentication service supports login methods that use smart cards, proximity cards, certificates, passwords, and challenge responses.

9. A method, comprising:
   receiving, by a Kerberos Key Distribution Center (KDC), a Kerberos authentication request from a principal pre-authenticated for Kerberos by an authentication service operating within a directory service that is configured to manage access to resources within a network system, the Kerberos authentication request containing pre-authentication information comprising a random password generated by the authentication service for the pre-authenticated principal;
   obtaining, by the KDC, a key corresponding to the random password for the pre-authenticated principal from a data structure on the directory service that is accessible by the KDC wherein the key is derived from the random password by the authentication service; and
   authenticating, by the KDC, the pre-authenticated principal for Kerberos using the key.

10. The method of claim 9, wherein the Kerberos authentication request includes the random password stored in a PA-ENC-TIMESTAMP field.

11. The method of claim 9, wherein the data structure further comprises a sequence of mechanisms used to authenticate the principal to the directory service, and wherein pre-authenticating includes embedding the sequence of mechanisms in a ticket granting ticket (TGT) sent to the principal by the KDC.

12. A system, comprising processing circuitry configured to operate on instructions stored in a computer-accessible media to provide a directory service configured to manage access to resources within a network system and comprising an authentication service for the directory service, wherein the instructions cause the authentication service to:
   receive, from a principal of the directory service, a request to pre-authenticate the principal for Kerberos;
   authenticate the principal for the directory service in response to receiving the request;
   generate a random password for the authenticated principal;

derive a key associated with the authenticated principal from the random password;

provide a Kerberos Key Distribution Center (KDC) with the key by storing the key in a data structure on the directory service that is accessible by the KDC; and send the random password to the authenticated principal for use as pre-authentication information in a Kerberos authentication request subsequently sent by the authenticated principal to the KDC.

13. The system of claim 12, wherein the authentication service supports multiple authentication mechanisms to receive a sequence of authentication mechanisms from the principal.

14. The system of claim 13, wherein the directory service further comprises a hierarchical, object oriented database that represents organizational assets in a logical tree and is used to authenticate the principal.

15. The system of claim 13, wherein the authentication service supports a sequence of authentication mechanisms that includes logical AND and logical OR connections between mechanisms.

16. The system of claim 13, wherein the sequence of multiple authentication mechanisms includes one or more mechanisms selected from a group of mechanisms consisting of:

password-based mechanisms, certificate-based mechanisms, and biometric-based mechanisms.

17. The system of claim 12, wherein the data structure is a look-up table containing a key for each authenticated principal that is pre-authenticated for Kerberos.

18. A network system, comprising processing circuitry configured to operate on instructions to provide a directory service, a Kerberos Key Distribution Center (KDC), a principal, and a Kerberos-enabled service, the directory service configured to manage access to resources within the network system and comprising an authentication service for the directory service, wherein the instructions cause the authentication service to:

receive, from a principal of the directory service, a request to pre-authenticate the principal for Kerberos;

authenticate the principal for the directory service in response to receiving the request;

generate a random password for the authenticated principal;

derive a key associated with the authentication principal from the random password;

provide the KDC with the key by storing the key in a directory structure on the directory service that is accessible by the KDC; and send the random password to the authenticated principal for use as pre-authentication information in a Kerberos authentication request subsequently sent by the authenticated principal to the KDC.

19. The network of claim 18, wherein the authentication service supports multiple authentication mechanisms and is to receive a sequence of authentication mechanisms from the principal.

20. The network of claim 18, wherein the data structure is a key cache containing a key for each authenticated principal that is pre-authenticated for Kerberos.

21. The network of claim 18 wherein the key expires after a time on the order of five minutes.

* * * * *